(12) United States Patent
Pattersson

(10) Patent No.: US 7,062,778 B1
(45) Date of Patent: Jun. 13, 2006

(54) METHOD FOR COMMUNICATING INFORMATION, A RECEIVER AND A TRANSMITTER FOR USE IN THAT METHOD AND A SYSTEM FOR PERFORMING THE METHOD

(75) Inventor: Jerry Pattersson, Uppsala (SE)

(73) Assignee: IR Vision AB, Uppsala (SE)

( * ) Notice: Subject to any disclaimer, the term of this patent is extended or adjusted under 35 U.S.C. 154(b) by 578 days.

(21) Appl. No.: 09/702,888

(22) Filed: Nov. 1, 2000

(30) Foreign Application Priority Data

Nov. 1, 1999  (DK) ................. 1999 01571

(51) Int. Cl.
G06F 3/00 (2006.01)
G06F 13/00 (2006.01)
H04N 5/445 (2006.01)
H04N 7/173 (2006.01)
H04B 7/00 (2006.01)
H04Q 7/20 (2006.01)
G07G 1/00 (2006.01)
G07G 1/14 (2006.01)

(52) U.S. Cl. .............. 725/46; 725/86; 455/456.1; 455/456.3; 455/456.6; 455/457; 455/41.2; 705/14

(58) Field of Classification Search ........... 340/7.45, 340/7.46, 7.48, 572.1; 725/42; 455/456.1, 455/456.3, 456.6, 457, 566, 41.2, 41.3; 705/14
See application file for complete search history.

(56) References Cited

U.S. PATENT DOCUMENTS

| 5,189,287 A | 2/1993 | Parienti |
| 5,239,700 A | 8/1993 | Guenther et al. |
| 5,287,266 A | 2/1994 | Malec et al. |
| 5,406,271 A | 4/1995 | Sonnendorfer et al. |
| 5,461,371 A | 10/1995 | Matsumoto et al. |
| 5,539,395 A | 7/1996 | Buss et al. |
| 5,589,835 A | 12/1996 | Gildea et al. |
| 5,929,848 A * | 7/1999 | Albukerk et al. ........... 345/700 |
| 5,979,757 A * | 11/1999 | Tracy et al. ................ 235/383 |
| 6,332,127 B1 * | 12/2001 | Bandera et al. .............. 705/14 |

FOREIGN PATENT DOCUMENTS

| AU | B3777695 | 9/1995 |
| DE | 19616150 A1 | 4/1996 |
| DE | 19616152 A1 | 4/1996 |
| EP | 0369188 | 10/1989 |
| EP | 0627706 A2 | 8/1994 |
| EP | 0725331 A1 | 9/1995 |
| EP | 0881821 A2 | 5/1998 |
| GB | 2265041 | 3/1992 |
| GB | 2298752 | 6/1996 |
| WO | WO8903555 | 6/1988 |
| WO | WO9114984 | 12/1990 |
| WO | WO9615517 | 11/1995 |
| WO | WO9834184 | 3/1997 |
| WO | WO9855954 | 6/1998 |
| WO | WO9859215 | 6/1998 |

* cited by examiner

Primary Examiner—Vivek Srivastava
Assistant Examiner—Joseph G. Ustaris
(74) Attorney, Agent, or Firm—Birch, Stewart, Kolasch & Birch, LLP (57) ABSTRACT

A system comprising a number of transmitters spatially separated and transmitting different local information. A number of portable or mobile receivers adapted to receive transmitted information and provide this to a user, the receivers being adapted to inform the user about which transmitters are available and allow the user to select a transmitter. The information is transmitted via IR light, microwaves or radio waves.

43 Claims, 4 Drawing Sheets

METHOD FOR COMMUNICATING INFORMATION, A RECEIVER AND A TRANSMITTER FOR USE IN THAT METHOD AND A SYSTEM FOR PERFORMING THE METHOD

The present invention relates to a method for communicating information and especially for a method where one or more mobile receivers, normally hand-held receivers, may receive information from one or more transmitters, where the or part of the information from a given transmitter relates specifically to the location of or the owner of that transmitter. In this manner, the receiver may receive and provide information relating to and normally controlled by a transmitter (or the owner thereof).

As opposed to systems where the transmitters have a large range of operation, such as transmitters of normal radio signals or TV signals, the present transmitters normally have a smaller range of operation and relate to information specific for a smaller area than a city or a country—normally a shop, a golf course, a parking lot or a building, such as a house. The user of the receiver will then, at different places during his/her normal day, be able to receive information from a number of different transmitters, which may transmit information helping/tempting, the user at different times or places during the day.

No such receivers, systems or methods are known to the inventors.

In a first aspect, the invention relates to a method for communicating information, comprising providing a plurality of transmitters having a limited transmission range and positioned in selected loci, each of the transmitters being capable of transmitting information which can be adapted to the particular location of the transmitter and to the time of transmission, providing a plurality of mobile receivers capable of receiving information from one or several of the transmitters, and of outputting the information, transmitting, from at least some of the transmitters, information which is related to the locus in which the transmitter is placed, optionally together with other information, displaying, on the display of at least some of the receivers, information relating to transmitters available to the receiver, and entering, at the display of the at least some of the receivers, a selection between the available transmitters, and thereby enabling the receivers to receive information at least part of which is dependent on the location of the individual receiver relative to the location of one or more of the transmitters.

This type of method or system provides a new manner of obtaining location specific information using the same receiver, which is preferably hand held. Any location having a transmitter may, preferably using the same communication protocol and information ordering, transmit its own information to the receivers in the vicinity. In this manner, restaurants, parking lots, shops, buildings, building complexes, aeroplanes, cars, trains, recreational areas, sport arenas, or any other area may provide its own information/advertising to the visitors/customers or merely people in the vicinity.

Also, the user's receiver may be used for obtaining information when being positioned e.g. in a car, aeroplane, or train. This may require that the car, aeroplane, or train comprises an external receiver and an internal transmitter for relaying information from the outside thereof to the inside thereof. Also, the internal transmitter may be used for transmitting both the relayed outside information as well as information relating to the actual car, aeroplane, or train. Optionally, the internal transmitter may be in the form of a holder holding the receiver while positioned in the vehicle.

The individual user would normally have his/her own receiver and use this to scan the flow of information.

Preferably:

each transmitter transmits information over one or more of a group of predetermined channels and the at least one of the receivers periodically, cyclically or continuously scan(s) the group of predetermined channels and display(s) the information relating to transmitters available to the receiver(s).

In this situation, the transmitters may transmit information in channels defined by one or more of the group consisting of:

channels defined by frequency/amplitude modulated signals modulated at different frequencies/amplitudes, channels defined by optical signals transmitted at different wavelengths, and channels defined by different slots in a time division multiplexing system.

Also, channels may be defined by signals receivable from a given position in different directions. Such signals may be any type of signal, such as omnidirectionally transmitted signals when received using a direction sensitive receiver, or the signal may be transmitted in a given direction whereby a direction insensitive receiver may be used.

Any known manner of transmitting two or more spatially overlapping signals in a manner so that they may be individually received may be used.

Preferably, the information comprises visual information, and the receivers comprise displays capable of representing the visual information, the displays having a predetermined minimum resolution, the transmitters and receivers being adapted to operate at a bandwidth which allows utilisation of the minimum resolution.

In order to increase the entertainment value, the bandwidth preferably allows transmission of a video signal. In this manner, the information may comprise a combination of images, resembling Internet home pages, and a video feed which the transmitters or owners thereof may provide for the pleasure of the owner of the receiver. This video feed may e.g. be a movie.

Thus, the same receiver may be used in e.g. an aeroplane for providing the menu, providing the advertising of the on-board shop, and for showing one or more videos during the trip.

As the receiver will normally be one for use by a single person—and as it should be expected that a number of transmitters may be positioned with overlapping ranges, the receivers may comprise means for selecting between different sources of information transmitted from one or several of the transmitters. In the simplest situation, the means for selecting between different sources of information may function without any transmission from the receivers.

Different information sources from a single transmitter may be information transmitted in a time-divided manner where e.g. every sixth time slot comprises information relating to a single information source. An example of a situation of this type would be in a super market where a single transmitter (or multiple transmitters transmitting the same signal) transmits this composite signal and where e.g. information relating to the meat department is transmitted in one channel and information relating the fruit department in another channel. Altering between the different channels or sources of information is then simply performed by shifting between which time slots to retrieve the information from.

In one manner, the means for selecting between different sources of information comprise means for performing the selection on the displays of the receivers. If the display is a touchscreen, activation of an area thereof may provide the selection. Alternatively, the screen may be a normal screen (e.g. a CRT or LED monitor), and the receiver may have a pointing device, such as a cursor/mouse or a number of buttons corresponding to different selections on the monitor.

Alternatively, at least some of the receivers may be capable of selecting between several available transmitters on the basis of a positioning and/or directioning of the receiver. Sensors exist that are able to inform the receiver of the identity of a given transmitter in order to have the receiver subsequently "locked" to that transmitter. In that situation, at least some of the at least some of the receivers may be provided with pointing means, and the selection between several available transmitters is performed by pointing the pointing means toward the desired transmitter.

Preferably, the range of the transmission of at least some of the transmitters is limited to a building in which one or more of the at least some of the transmitters is located. In that situation, the information provided by such transmitters may relate to the building or its contents. In some instances, actually, the range of the transmission of at least some of the transmitters may be limited to a room.

In the preferred embodiment, the displays of at least some of the receivers are touchscreens. This provides the most simple and robust product in that the same user interface is used for outputting information and entering selections. Also, this user interface is versatile in that the number of selection entering means is defined by the touchscreen and not e.g. the number of push buttons on the receiver. New applications, new screen layouts or new types of information may be provided without being limited to e.g. the number and positioning of push buttons on the receiver.

As mentioned before, preferably the information transmitted by at least some of the transmitters comprises video and/or audio.

In the present system and method, the owner or operator of the transmitters may independently decide on the contents of the information transmitted. Due to the overall concept, this information will normally comprise information related to the vicinity of the transmitter. However, the owner or operator may decide that the information transmitted by at least some of the transmitters comprises non-local information from information providers who have leased all or part of the bandwidth of the respective transmitters. Such information may be advertisements or video feeds, news channels, information/home pages from the Internet etc. which rents or leases part of the information flow to the receivers.

Naturally, the locus-related information may be any information which the owner or operator wishes to transmit. The following are examples thereof:

information relating to free spaces in a parting lot or parking area,
information relating to offers or products in a super market or other type of shop,
information relating to items exposed, exhibited or offered for sale at a given location,
information relating to places visited during trips or round trips, and
information relating to the status of different items, such as refrigerators, locks, lamps, etc., of a building.

It may be desired to transmit information from one or more of the receivers to one or more of the transmitters. One reason for this would be when the information transmitted to a transmitter makes the transmitter alter the information transmitted thereby. In that manner, an interaction takes place between the user of the receiver and the owner/operator of the transmitter, so that the user gets the information desired or is able to influence the quality or contents of the information transmitted by that transmitter.

Preferably, the information transmitted by at least one transmitter comprises a number of different parts of information, each part at least comprising first and second information, the first information relating to an image to be presented on a screen or monitor of a receiver. In one situation, the information transmitted will correspond to a number of fixed screen images and maybe one or two video feeds.

In that situation, when the receiver comprises a touchscreen and when the first information of a presently active part is output by the receiver by showing at least some of that information on the touchscreen, then, if one or more predetermined areas of the touchscreen is/are activated, at least part of the first information relating to one or more other selected parts is/are output, the second information of the active part being decisive in determining, on the basis of the activated area(s), which other part(s) to select. Thus, the second information comprises information defining which areas of the touchscreen are activatable and which other parts of the information to change to if a given activatable area is selected.

It may be desired not to do this if predetermined second information is selected, which may be when a video signal received from a transmitter is to be shown on the touchscreen. In that situation, the contents of this information from a transmitter will change rapidly (as opposed to the contents of still images or more or less fixed screen images), but the information relating to the actions to be taken while viewing the movie or video feed may remain the same. E.g. a subsequent activation of a predetermined area of the touchscreen may select a predetermined part and output at least part of the first information thereof and thereby cease the viewing of the video feed.

Preferably, a transmitter periodically transmits the information to the one or more receivers, and the period of transmission is preferably sufficiently high to ensure that the video signal is transmitted with a predetermined bandwidth.

This may be obtained by transmitting all parts of the information at a rate sufficient for the video signal. Another manner is to transmit the part of the information comprising the video signal at a sufficient rate and then interpose the remaining, less often changing parts in between the "video signal parts". Thus, when the parts are transmitted serially, all parts may be transmitted in a given order—and at a rate so that all parts are transmitted at 30 Hz or more. Alternatively, the "video part" may be transmitted as every second (or other periodical manner) part and the other parts in the other "time slots". Then, the rate of transmission may be much smaller but the rate of the video signal maintained.

A second aspect of the invention relates to receiver for use in the above method, the receiver comprising:

means for receiving and storing transmitted information,
means for selecting between different parts of the information received,
means for outputting the selected information,
display means for displaying information relating to transmitters available to the receiver, and means for entering a selection between the available transmitters.

The receiver preferably also comprises means for continuously or cyclically scanning a predetermined group of channels/information and displaying information relating to transmitters available and transmitting at one or more of the channels.

In this situation, the scanning means may comprise means for scanning channels defined by one or more of the group consisting of:
channels defined by frequency/amplitude modulated signals modulated at different frequencies/amplitudes,
channels defined by optical signals transmitted at different wavelengths, and
channels defined by different slots in a time division multiplexing system.

Preferably, the selecting means comprise a touchscreen, and is adapted to have a first predetermined part of the information selected by a user touching the touchscreen at a predetermined position. Also, the selecting means preferably comprise means for determining, depending on which predetermined position the user touched, which other part of the received information to output.

Also, the receiving means may comprise means for selecting between different sources of information transmitted from one or several transmitters, where the means for selecting between different sources of information preferably function without any transmission from the receivers.

As described above, preferably the means for selecting between different sources of information comprise means for performing the selection on the touchscreen, and the selecting means may be adapted to select between several available transmitters on the basis of a positioning and/or directioning of the receiver. Also, the selecting means may comprise pointing means, and the selection between several available transmitters may be performed by pointing the pointing means toward the desired transmitter.

It is desired that the touchscreen is adapted to show transmitters available to the receiver.

In order to have an interaction with the owner/operator of the transmitter or an influence on the information transmitted thereby, the receiver may comprise means for transmitting information to one or more of the transmitters.

In a number of situations, it is desired that the selecting means and the outputting means are adapted to output a video signal, if a second predetermined part of the information is selected. In that situation, the selecting means are adapted to, when the second predetermined part is selected, select and output a predetermined first part of the information received upon activation of the touchscreen.

Preferably, the information relating to the individual parts comprise the same overall components. Thus, the means for receiving and storing information may comprise means for dividing the information into the different parts thereof and for storing the individual parts in different predetermined parts of the storing means, and where the selecting means comprises means for identifying the part of the storing means corresponding to the selected part of the information. In that manner, the outputting or showing of a given part of the information may be standardised.

Thus, the receiving and storing means may comprise:
means for dividing the information of different parts of the information into first information at least part of which is to be shown and second, controlling information, and
means for, for each of the different parts of information, storing the information in at least essentially the same manner/order so that the outputting means may output these parts of the information using the same procedure.

Also, in order to increase the amount of information, which can be received and handled by a receiver, it may further comprise means for increasing the capability of the storing means by interacting and/or engaging with an additional storing means.

In a third aspect, the invention relates to a transmitter for use in the above method, the transmitter comprising:
means for receiving and storing information to be transmitted,
means for identifying different parts of the information,
means for dividing the information of individual parts of the information into first information at least part of which is to be shown and second, controlling information,
means for transmitting the received information in a manner so that the information of the individual parts of information is transmitted in at least substantially the same manner/order.

As mentioned, the transmitting means are preferably adapted to perform a continuous, a repeated, and/or a periodical transmission of the information, and a period of transmission of the information is preferably sufficiently high to ensure that the video signal is transmitted with a predetermined bandwidth as one of the different parts of the information. All parts of the information may be transmitted at this frequency or rate—or the video signal part(s) may be transmitted at a rate higher than that of other parts of the information.

Also, the receiving and storing means comprise a plurality of means for receiving or generating information, such as to receive information from a nearby data or information storage as well as from e.g. the Internet, TV, or other means of data or information transfer from remote positions (computer modem, TV broadcast, Telephone cables, the Internet, satellite communication etc.) where at least one means for receiving or generating information is adapted to receive or generate information relating to a vicinity of a location of the transmitter, and wherein at least one other means for receiving or generating information is adapted to receive or generate information relating to one or more locations remote from the location of the transmitter.

In the following, the preferred embodiment of the receiver, the KnowledgeMan, is described with reference to the drawings, wherein.

Transmitter

The transmission is performed using any suitable wireless communication. In this description we will concentrate upon infrared (IR) waves.

The IR transmitter is connected to a computer, an E-prom, or some other information source.

The transmission can be utilised by light emitting diodes or laser diodes. The modulation can either be in the linear region of the devices or by high speed switching using the analogue value to control the duty cycle.

The surround radiation be achieved either by the use of a single high power laser and an optical divergence scheme. One way is for instance to point at a rotational symmetric convex 'mirror' mounted in the ceiling. The laser is mounted concentric with this mirror.

Alternatively one or several rings of LEDs or LDs can cover the space.

The information transmitted by the transmitter may vary and may depend on the owner of the transmitter. Thus, this information may be more or less static pages or a combination of such pages and a continuous video/audio feed. Also, the transmitter may transmit information relating to the owner of the transmitter combined with information provided by a third party, which has leased part of the bandwidth of the system.

Preferably the transmitter is adapted to receive parts of information such as on the form of WWW pages (HTML pages) comprising predefined areas and links thereon to other pages. Also, the transmitter—or the computer thereof—is adapted to transfer such pages into first and second information where the first information comprises the graphical information of a page and where the second information comprises information relating to each active area and an identity of the other parts of the information which comprise information of the pages pointed to by the links of the HTML pages. Thus, the operation and interoperability/interlinking of the HTML pages is copied. However, in order to simplify the operation of the receiver, the links of the HTML pages is replaced by simple information relating to the activatable area of the touchscreen of the receiver and the position of the pertaining other page in its memory.

Transmission

The transmitted data is in analogue form and may contain text, pictures, video and audio. Using analogue transmission leads to an increased transmission rate and cost reductions. The transmission rate is around 30 frames/sec.

The transmitted data can either be collected in one single stream, or using several fully parallel streams, transporting the three components of video/pictures, the two streams for stereo audio, and one stream for control information.

Receiver

The receiver, in the present context termed "Knowledge-Man", comprises an IR receiver, a memory with a memory manager, a LCD display with a controller and a memory, and a touchscreen.

Functions of the Receiver

KnowledgeMan receives data through the memory manager and fills the memory. A certain protocol is used for packaging the transmitted data in order to unpack the received data.

The information can be in any unit size from a single line on a display to a sequence of pictures in a video stream. It depends on the type of information radiated by the transmitter.

Regardless of sequence of transmission, the receiver shall be able to store the information correctly in memory. The selection of information from the memory is performed independent of the receiving process.

Every information source has a start page showing the available subjects, which the user may select. This start page is grabbed by the LCD controller from the memory and is displayed on the LCD screen. At the same time the LCD controller sends information to the touchscreen processor about how many touchscreen buttons exist and where the are to be located on the LCD screen.

The user may now select the subject of interest. The touchscreen controller sends information to the memory manager, which in turn selects the appropriate data from the memory and sends it further to the LCD controller and displays it on the screen as a new page. The touch screen processor is also updated with information about new touch buttons.

This is the way the user may surf around the information available from one information source.

The transmission is in continuous mode, which means that the memory is updated all the time as long as the connection with the transmitter is on. When a disconnection appears, the receiver still has the stored data available for the user.

The user may also lock the receiver to a certain information source in order to avoid data from other information sources to be displayed on the LCD screen.

With a Halifax sensor it is also possible to display the direction in which the actual transmitter is located in order to get the optimal transmission coverage.

The receiver has full video and audio capacity. When receiving video information the memory manager can transfer the information directly to the LCD display without using the memory.

In addition this more static way of displaying information, one page of the memory may receive e.g. video via the continuous updating of the memory. Choosing this memory will provide the user with a video feed for use e.g. in aeroplanes, trains or in cars. Preferably, in this situation, the KnowledgeMan will comprise means for outputting audio to e.g. a set of speakers or a set of headphones.

Components

In the preferred embodiment, the specific components/operations are:

Frame Grabber

Divides the information sent in frames and stores the frames in the memory. A frame is a complete page, which may be displayed on the LCD screen.

Memory

Several subjects may exist from one information source. Each subject is defined in an hierarchy of frames/pages. The hierarchy is established by existing push buttons in each frame where each push button represents a new frame. The frames are stored in hierarchy level sequence in the memory.

For example, we have three subjects (A, B, C) with the following structure of frames:

| Level 1 | A | B | C | Level 2 |
|---|---|---|---|---|
| A1,A2 | B1 | C1,C2,C3 | | |
| Level 3 | A3.A4 | B2,B3 | C4,C5,C6,C7,C8 | |

The storage sequence will then be:
A B C A1 A2 B1 C1 C2 C3 A3 A4 B2 B3 C4 C5 C6 C7 C8

The storing procedure then starts all over again. There are also several optimisation procedures defined in order to utilise the memory in the best way.

The memory may be expanded by e.g. providing a replaceable memory of any known type.

Memory Frame

A memory frame comprises information that will be displayed and also information, which defines push buttons and the position and area of each push button on the display. In addition, the frame contains links to the following frames on the next level in the hierarchy for one subject.

Frame Controller

Fetches the next memory frame (part of the information transmitted and received) from memory, displays at least part of the first information thereof on the LCD screen and gives the Touch screen the co-ordinates (part of the second information of the part) for the area of existing push buttons in the frame.

Touch Screen

Subsequent to an input, the touchscreen tells the Frame controller what frame is to be displayed next.

LCD Screen

Displays the actual frame.

Page Memory

Remembers the last displayed frame number. If a disconnection appears this frame will be displayed.

Figure 1:
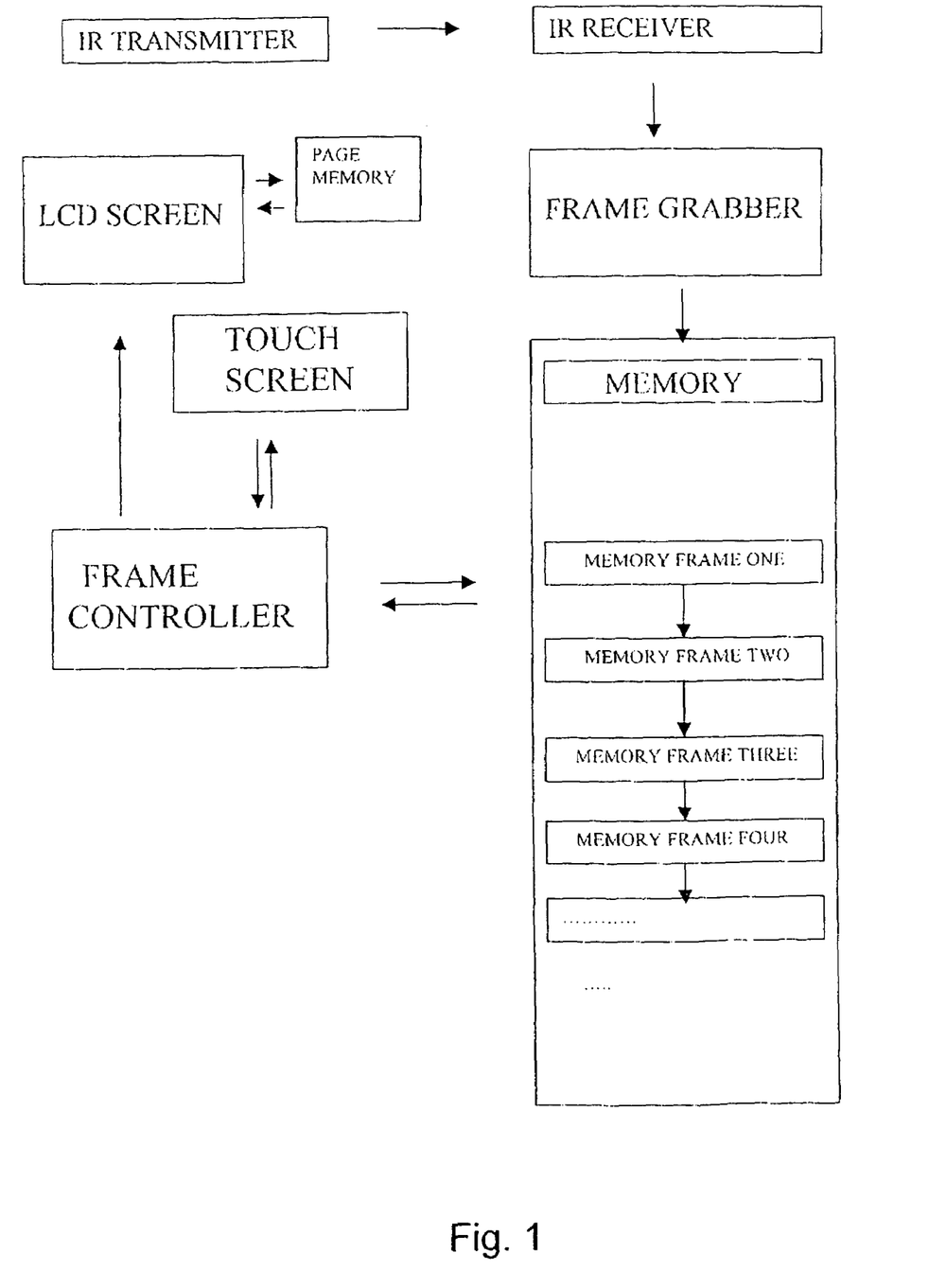
FIG. 1 illustrates the preferred hardware set-up and operation.

An example of the hardware set-up and the communication or operation thereof may be seen from FIG. 1.

Operation

Figure 2:
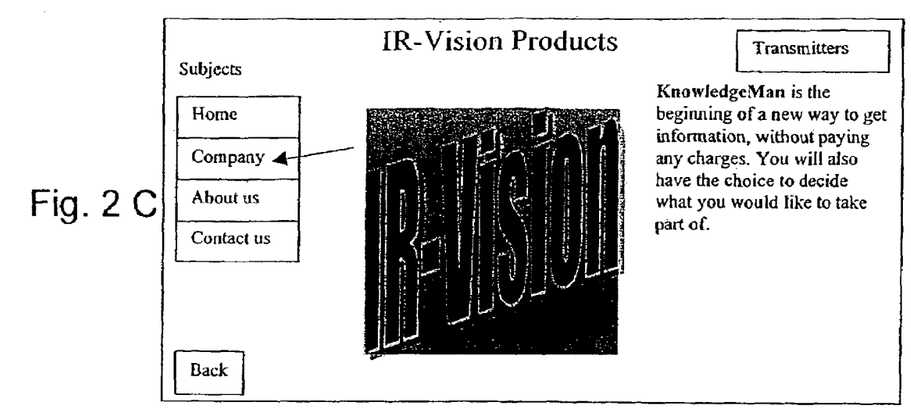
FIG. 2 illustrates how to navigate in the information received by the KnowledgeMan.
Figure 2A:
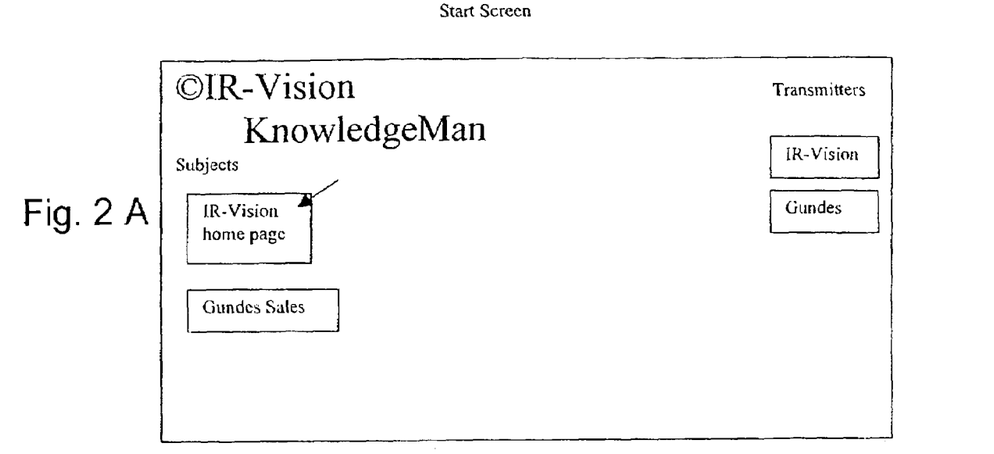
Figure 2B:
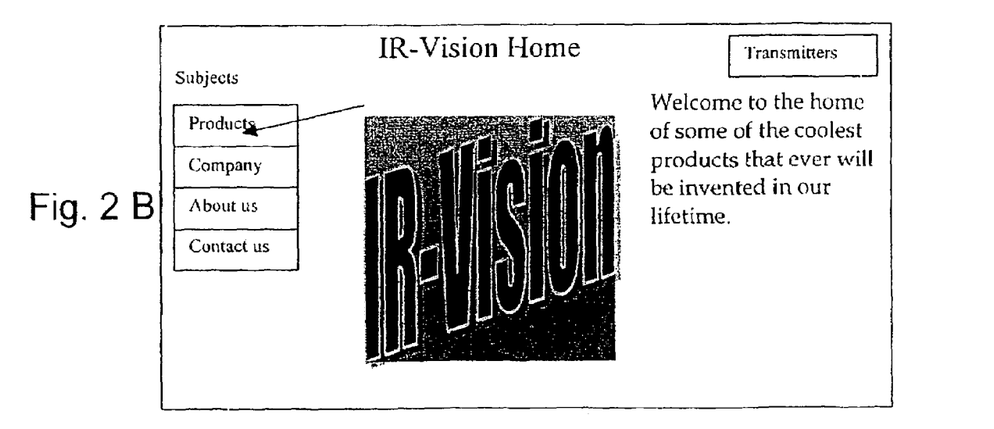

From FIG. 2, the manner of operation may be seen where FIG. 2A is the start page illustrated on the display when e.g. information from a new transmitter is received. This display provides a number of touch areas for the user to select between two transmitters and two subjects.

The individual illustrations of FIG. 2 illustrate how the selection of a given choice changes the information on the screen as well as the positions and contents/actions of the available push buttons on the screen.

It is seen that by pressing (transmitters), the available transmitters may be seen and any thereof may be selected in order to totally change the contents and information of the KnowledgeMan.

The invention claimed is:

1. A method for communicating information, comprising
providing a plurality of transmitters having a limited transmission range and positioned in selected loci, each of the transmitters being capable of transmitting information which can be adapted to the particular location of the transmitter and to the time of transmission,
providing a plurality of mobile receivers capable of receiving information from one or several of the transmitters, and of outputting the information,
transmitting, from at least some of the transmitters, first information to be output by mobile receivers, each of which is provided by an information provider related to the locus in which the transmitter is placed, optionally together with other information,
displaying, on the display of at least some of the receivers, the first information transmitted by transmitters available to the receiver, and
entering, at the display of the at least some of the receivers, a selection between the available transmitters,
and thereby enabling the receivers to receive, from a selected transmitter, second information that is to be output, where at least part of said second information includes local information dedicated to the locus within which the selected transmitter is placed, the local information being prepared by the information provider of the first information.

2. A method according to claim 1, wherein:
each transmitter transmits the first information over one or more of a group of predetermined channels and
the at least one of the receivers periodically, cyclically or continuously scan(s) the group of predetermined channels and display(s) the first information relating to transmitters available to the receiver(s).

3. A method according to claim 2, wherein the transmitters transmit the first information in channels defined by one or more of the group consisting of:
channels defined by frequency/amplitude modulated signals modulated at different frequencies/amplitudes,
channels defined by optical signals transmitted at different wavelengths, and
channels defined by different slots in a time division multiplexing system.

4. A method according to claim 1, wherein the first or second information comprises visual information, and the receivers comprise displays capable of representing the visual information, the displays having a predetermined minimum resolution, the transmitters and receivers being adapted to operate at a bandwidth which allows utilisation of the minimum resolution.

5. A method according to claim 3, wherein the bandwidth allows transmission of a video signal.

6. A method according to claim 1, wherein the receivers comprise means for selecting between different sources of information transmitted from one or several of the transmitters.

7. A method according to claim 6, wherein the means for selecting between different sources of information function without any transmission from the receivers.

8. A method according to claim 6, wherein the means for selecting between different sources of information comprise means for performing the selection on the displays of the receivers.

9. A method according to claim 1, wherein the range of the transmission of at least some of the transmitters is limited to a building in which one or more of the at least some of the transmitters is located.

10. A method according to claim 9, wherein the range of the transmission of at least some of the transmitters is limited to a room.

11. A method according to claim 1, wherein at least some of the receivers are capable of selecting between several available transmitters on the basis of a positioning and/or directioning of the receiver.

12. A method according to claim 9, wherein at least some of the at least some of the receivers are provided with pointing means, and the selection between several available transmitters is performed by pointing the pointing means toward the desired transmitter.

13. A method according to claim 1, wherein the displays of at least some of the receivers are touchscreens.

14. A method according to claim 1, wherein the first or second information transmitted by at least some of the transmitters comprises video and/or audio.

15. A method according to claim 1, wherein the first or second information transmitted by at least some of the transmitters comprises non-local information from the information providers who have leased all or part of the bandwidth of the respective transmitters.

16. A method according to a claim 1 wherein the local information is selected from the group consisting of:
information relating to free spaces in a parking lot or parking area,
information relating to offers or products in a super market or other type of shop,
information relating to items exposed, exhibited or offered for sale at a given location,
information relating to places visited during trips or round trips, and information relating to the status of different items, such as refrigerators, locks, lamps, etc., of a building.

17. A method according to claim 1, further comprising transmitting third information from one or more of the receivers to one or more of the transmitters.

18. A method according to claim 17, wherein the third information transmitted to a transmitter makes the transmitter alter the second information transmitted thereby.

19. A method according to claim 1, wherein the first or second information transmitted by at least one transmitter comprises a number of different parts of information, each part at least comprising third and fourth information, the third information relating to an image to be presented on a screen or monitor of a receiver.

20. A method according to claim 19, wherein the receiver comprises a touchscreen and wherein the third information of an active part is output by the receiver by showing at least some of the third information on the touchscreen, and wherein, if one or more predetermined areas of the touchscreen is/are activated, at least part of the third information relating to one or more other selected parts is/are output, the fourth information of the active part being decisive in determining, on the basis of the activated area(s) which other part(s) to select.

21. A method according to claim 20, wherein, if a predetermined part of the first or second information is selected, a video signal received from a transmitter is shown on the touchscreen.

22. A method according to claim 21, where a subsequent activation of a predetermined area of the touchscreen will select a predetermined part and output at least part of the third information thereof.

23. A method according to claim 21, wherein a transmitter periodically transmits the first or second information to the one or more receivers, and where the period of transmission is sufficiently high to ensure that the video signal of the second part of the first or second information is transmitted with a predetermined bandwidth.

24. A receiver for use in the method according to claim 1, the receiver comprising:
   means for receiving and storing transmitted the first or second information,
   means for selecting between different parts of the first or second information received,
   means for outputting the selected information,
   display means for displaying the first information relating to transmitters available to the receiver, and
   means for entering a selection between the available transmitters.

25. A receiver according to claim 24, further comprising means for continuously or cyclically scanning a predetermined group of channels and displaying the first information relating to transmitters available and transmitting at one or more of the channels.

26. A receiver according to claim 25, wherein the scanning means comprise means for scanning channels defined by one or more of the group consisting of:
   channels defined by frequency/amplitude modulated signals modulated at different frequencies/amplitudes,
   channels defined by optical signals transmitted at different wavelengths, and
   channels defined by different slots in a time division multiplexing system.

27. A receiver according to claim 24, wherein the selecting means comprise a touchscreen being adapted to have a first predetermined part of the first or second information selected by a user touching the touchscreen at a predetermined position.

28. A receiver according to claim 24, wherein the receiving means comprises means for selecting between different sources of information transmitted from one or several transmitters.

29. A receiver according to claim 28, wherein the means for selecting between different sources of information function without any transmission from the receivers.

30. A receiver according to claim 24, wherein the means for selecting between different sources/channels of information comprise means for performing the selection on the touchscreen.

31. A receiver according to claim 24, wherein the selecting means are adapted to select between several available transmitters on the basis of a positioning and/or directioning of the receiver.

32. A receiver according to claim 29, the selecting means comprising pointing means, and the selection between several available transmitters being performed by pointing the pointing means toward the desired transmitter.

33. A receiver according to claim 24, the receiver further comprising means for transmitting the third information to one or more of the transmitters.

34. A receiver according to claim 24, wherein the selecting means and the outputting means are adapted to output a video signal, if a second predetermined part of the first or second information is selected.

35. A receiver according to claim 34, wherein the selecting means are adapted to, when the second predetermined part is output, select and output a predetermined first part of the first or second information received upon activation of the touchscreen.

36. A receiver according to claim 24, wherein the means for receiving and storing the first or second information comprise means for dividing the first or second information into the different parts thereof and for storing the individual parts in different predetermined parts of the storing means, and where the selecting means comprises means for identifying the part of the storing means corresponding to the selected part of the first or second information.

37. A receiver according to claim 36, wherein the receiving and storing means comprises:
   means for dividing the first or second information of different parts of the information into information to be shown and controlling information, and
   means for, for each of the different parts of information, the information in at least essentially the same manner/order so that the outputting means may output these parts of the information using the same procedure.

38. A receiver according to claim 24, further comprising means for increasing the capability of the storing means by interacting and/or engaging with an additional storing means.

39. A transmitter for use in the method according to claim 1, the transmitter comprising:
   means for receiving and storing the first or second information to be transmitted,
   means for identifying different parts of the first or second information,
   means for dividing the first or second information of individual parts of the information into third information to be shown and fourth, controlling information,
   means for transmitting the received first or second information in a manner so that the information of the individual parts of information is transmitted in at least substantially the same manner/order.

40. A transmitter according to claim 39, wherein the transmitting means are adapted to perform a continuous, a repeated, and/or a periodical transmission of the first or second information.

41. A transmitter according to claim 40, wherein a period of transmission of the first or second information is sufficiently high to ensure that the video signal is transmitted with a predetermined bandwidth as one of the different parts of the information.

42. A transmitter according to claim 39, wherein the receiving and storing means comprise a plurality of means for receiving or generating information, where at least one means for receiving or generating information is adapted to receive or generate information relating to a vicinity of a location of the transmitter, and wherein at least one other means for receiving or generating information is adapted to receive or generate information relating to one or more locations remote from the location of the transmitter.

43. A system for providing information and for performing the method according to claim 1, the system comprising a plurality of the receivers according to claim 24 and a plurality of the transmitters according to claim 39.

* * * * *